United States Patent
Goel et al.

(10) Patent No.: US 9,980,275 B2
(45) Date of Patent: May 22, 2018

(54) SYSTEMS AND METHODS FOR IMPROVING CALL PERFORMANCE DURING CELL SELECTION ON A MULTI-SUBSCRIBER IDENTITY MODULE (SIM) WIRELESS COMMUNICATION DEVICE

(71) Applicant: QUALCOMM Incorporated, San Diego, CA (US)

(72) Inventors: Neha Goel, Woking (GB); Ankur Srivastava, Lucknow (IN); Kishore Kumar Yannakula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 15/000,346

(22) Filed: Jan. 19, 2016

(65) Prior Publication Data
US 2017/0208603 A1 Jul. 20, 2017

(51) Int. Cl.
*H04W 68/02* (2009.01)
*H04W 48/16* (2009.01)
(Continued)

(52) U.S. Cl.
CPC .......... *H04W 72/10* (2013.01); *H04B 17/382* (2015.01); *H04W 36/14* (2013.01);
(Continued)

(58) Field of Classification Search
CPC ......... H04W 8/18; H04L 47/245; H04L 67/10
See application file for complete search history.

(56) References Cited

U.S. PATENT DOCUMENTS

2005/0048982 A1 3/2005 Roland et al.
2014/0128082 A1 5/2014 Chirayil
(Continued)

FOREIGN PATENT DOCUMENTS

WO 2015105765 A1 7/2015

OTHER PUBLICATIONS

International Search Repoty and Written Opinion—PCT/US/013878—ISA/EPO—Apr. 13, 2017.

*Primary Examiner* — Ayaz Shikh
*Assistant Examiner* — Debebe Asefa
(74) *Attorney, Agent, or Firm* — The Marbury Law Group

(57) ABSTRACT

A multi-subscriber identity module (SIM) wireless communication device performing early camping in initial cell selection or reselection may detect an active communication on a modem stack associated with a first SIM, and a condition requiring initial cell selection/reselection on a modem stack associated with a second SIM. In response to receiving a paging message for the second SIM, the wireless communication device may trigger a radio resource to tune to a frequency of an identified target cell of the second SIM, receive a first portion of system information broadcast by the identified target cell, and determine whether initial cell selection/reselection to the identified target cell is complete. In response to determining that initial cell selection/reselection to the identified target cell is not complete, the wireless communication device may save the received paging message, and raise a priority level for the activity on the modem stack associated with the second SIM.

27 Claims, 7 Drawing Sheets

(51) Int. Cl.
*H04W 88/06* (2009.01)
*H04B 17/382* (2015.01)
*H04W 72/10* (2009.01)
*H04W 36/14* (2009.01)
*H04W 48/18* (2009.01)

(52) U.S. Cl.
CPC ........... *H04W 48/16* (2013.01); *H04W 48/18* (2013.01); *H04W 68/02* (2013.01); *H04W 88/06* (2013.01)

(56) References Cited

U.S. PATENT DOCUMENTS

| | | |
|---|---|---|
| 2015/0043533 A1 | 2/2015 | Kim et al. |
| 2015/0056988 A1 | 2/2015 | Goel et al. |
| 2015/0201355 A1 | 7/2015 | Kotreka et al. |
| 2015/0271724 A1 | 9/2015 | Kotreka et al. |
| 2015/0296364 A1* | 10/2015 | Peruru .................. H04W 8/005 455/434 |
| 2015/0373531 A1* | 12/2015 | Goel ..................... H04W 8/186 370/328 |

\* cited by examiner

SYSTEMS AND METHODS FOR IMPROVING CALL PERFORMANCE DURING CELL SELECTION ON A MULTI-SUBSCRIBER IDENTITY MODULE (SIM) WIRELESS COMMUNICATION DEVICE

BACKGROUND

Multi-subscriber identity module (SIM) wireless communication devices have become increasing popular because of their flexibility in service options and other features. One type of multi-SIM wireless communication device, a multi-SIM multi-standby (MSMS) wireless communication device (e.g., a dual-SIM dual-standby (DSDS) device), enables two SIMs to be in idle mode waiting to begin communications, but only allows one SIM at a time to participate in an active communication due to sharing of a single radio frequency (RF) resource (e.g., a transceiver). Other multi-SIM devices may extend this capability to more than two SIMs and may be configured with any number of SIMs greater than two (i.e., multi-SIM multi-standby wireless communication devices).

Wireless communication networks (referred to simply as "wireless networks" herein) are widely deployed to provide various communication services such as voice, packet data, broadcast, messaging, and so on. Wireless networks may be capable of supporting communication for multiple users by sharing the available network resources. Such sharing of available network resources may be implemented by networks using one or more multiple-access wireless communications protocols, such as Time Division Multiple Access (TDMA), Code Division Multiple Access (CDMA), and Frequency Division Multiple Access (FDMA). These wireless networks may also utilize various radio technologies, including but not limited to Global System for Mobile Communications (GSM), Universal Mobile Telecommunications System (UMTS), CDMA2000, Advanced Mobile Phone Service (AMPS), General Packet Radio Services (GPRS), Long Term Evolution (LTE), High Data Rate (HDR) technology (e.g., 1×EV technology), etc.

Since an MSMS wireless communication device typically uses a single RF resource to communicate over the multiple SIMs and/or networks, the device actively communicates using a single SIM and/or network at a given time. For example, while one SIM is participating in active communication on a particular network, the second SIM may be in idle mode camped on a serving cell of the same or different network. As such, with an active data communication on one SIM (e.g., the first SIM), the wireless communication device may periodically tune away to a network associated with another SIM (e.g., the second SIM) to monitor signals or acquire a connection. During idle mode on a SIM, the MSMS wireless communication device will periodically determine whether there is a better cell on which to camp and receive service. Reselection to a new cell may be triggered if the received signal level for any neighbor is better than that of the current serving cell for a period of time (e.g., at least five seconds in a GSM system).

In order to minimize delay in service that can occur in initial cell selection or reselection, the MSMS wireless communication device can implement early camping for a SIM by initially receiving sufficient system information to process a paging channel for the target cell, and if a paging message is received, save the page message for processing after completion of the cell selection/reselection. This early camping procedure may reduce the chance of missing a paging message to the second SIM during initial cell selection or cell reselection. However, some of the remaining system information for the second SIM may not be received due to conflicts in timing between the broadcast of the system information and the active communication on the first SIM. As a result, the wireless communication device may be unable to process the paging message for the second SIM, in which case the paging message will be discarded, thereby degrading performance for receiving mobile terminating calls on the device.

SUMMARY

Methods and devices implementing methods of various embodiments may enable improving performance of a multi-subscriber identity module (SIM) wireless communication device configured to use at least a first SIM and a second SIM associated with a shared radio frequency (RF) resource by detecting an active communication in a first network on a modem stack associated with the first SIM, detecting a condition requiring initial cell selection or cell reselection on a modem stack associated with the second SIM, triggering the RF resource to tune to a frequency of a identified target cell on the modem stack associated with the second SIM, receiving a first portion of system information broadcast by the identified target cell, and determining whether initial cell selection or cell reselection to the identified target cell is complete in response to receiving a paging message for the second SIM. Some embodiments may further include saving the received paging message and raising a priority level for activity on the modem stack associated with the second SIM in response to determining that initial cell selection or reselection to the identified target cell is not complete. In some embodiments, the first portion of the system information may be sufficient to receive paging messages from the identified target cell. In some embodiments, the priority level may be used to arbitrate access to the RF resource between the first SIM and the second SIM.

In some embodiments, raising the priority level for activity on the modem stack associated with the second SIM may include passing an indication of high priority to a scheduler for the RF resource. In some embodiments, raising the priority level for activity on the modem stack associated with the second SIM may include indicating a priority that is sufficiently high to supersede a priority level of activity on the first SIM. Some embodiments may further include identifying a target cell for initial cell selection or cell reselection based on at least one of channel conditions of a serving cell for the modem stack associated with the second SIM, quality of signals broadcast by neighbor cells, and a public land mobile network (PLMN) selected for the modem stack associated with the second SIM. In some embodiments, the modem stack associated with the second SIM may be camped in idle mode on a serving cell in a second network. In some embodiments, triggering the RF resource to tune to the frequency of the identified target cell may be performed during a wake-up period of a power-saving mode cycle associated with the second network.

Some embodiments may further include, in response to determining that initial cell selection or reselection to the identified target cell is not complete, determining whether full system information broadcast by the identified target cell has been received, and returning the priority level for activity on the second SIM to an original level in response to determining that the full system information broadcast by the identified target cell has been received. Some embodiments may further include processing the saved paging message for the second SIM in response to determining that the full system information broadcast by the identified target cell has been received.

Some embodiments may further include determining whether the paging message indicates that a mobile terminating call to the second SIM is pending, and cancelling or suspending the active communication on the modem stack associated with the first SIM in response to determining that the paging message indicates that a mobile terminating call to the second SIM is pending. In some embodiments, the identified target cell may belong to a Global Mobile Communications (GSM) network. In some embodiments, receiving the first portion of the system information broadcast by the identified target cell may include receiving at least a system information message type 3 (SI3).

Various embodiments include a wireless communication device including an RF resource configured to support at least a first SIM and a second SIM, and a processor configured with processor-executable instructions to perform operations of any of the methods described above. Various embodiments also include a non-transitory processor-readable medium on which is stored processor-executable instructions configured to cause a processor of a wireless communication device to perform operations of any of the methods described above. Various embodiments include a wireless communication device having means for performing functions of any of the methods described above.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
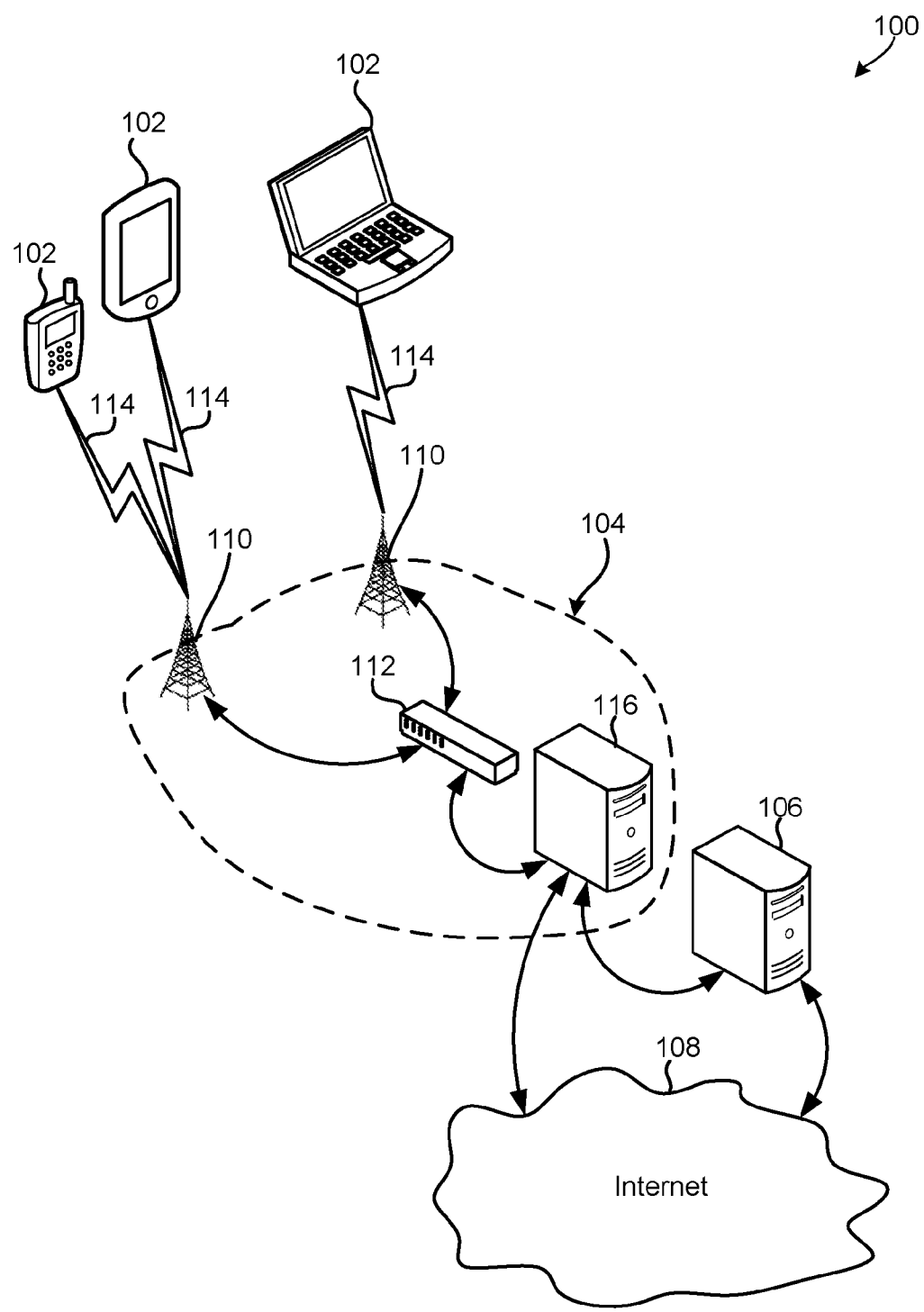
FIG. 1 is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the claims.

Various embodiments provide methods and MSMS wireless communication devices for improving performance on a second SIM using a shared RF resource for cell selection during an active communication on a first SIM. In MSMS wireless communication devices, the shared RF resource is typically used to support both SIMs when both are in idle mode, but one SIM at a time when at least one SIM transitions out of idle mode. Various embodiments may reduce missed paging messages on the second SIM resulting from using early camping to perform initial cell selection or reselection during an active communication on the first SIM. Following performing early camping to select or reselect a target cell for the second SIM (i.e., receiving partial system information for the new cell), the wireless communication device may detect whether any paging messages to the second SIM are received from the identified target cell. When a paging message is received for the second SIM prior to receiving full system information from the identified target cell, the received paging message may be saved on the MSMS wireless communication device, and a priority associated with the second SIM may be temporarily increased in order to ensure access to the shared RF resource for receiving the remaining system information.

The term "wireless communication device" is used herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "subscription," "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless communication device on a network. Examples of SIMs include the Universal Subscriber Identity Module (USIM) provided for in the LTE 3GPP standard, and the Removable User Identity Module (R-UIM) provided for in the 3GPP2 standard. Universal Integrated Circuit Card (UICC) is another term for SIM.

The terms subscription and SIM may also be used as shorthand reference to a communication network associated with a particular SIM, since the information stored in a SIM enables the wireless communication device to establish a communication link with a particular network, thus the SIM and the communication network, as well as the services and subscriptions supported by that network, correlate to one another.

As used herein, the terms "multi-SIM multi-standby wireless communication device" and "MSMS wireless communication device" are used interchangeably to refer to a wireless communication device that is configured with more than one SIM each enabling a subscription that share one radio frequency (RF) resource that enables idle-mode operations to be performed on two networks simultaneously, as well as selective communication on one network while performing idle-mode operations on the other network. For example, a first subscription may be a first technology standard, such as GSM Enhanced Data rates for GSM Evolution (EDGE) (also referred to as GERAN), while a second subscription may support the same technology standard or a second technology standard, such as WCDMA. An example of an MSMS wireless communication device is a dual-SIM wireless communication device (DSDS device) in which subscriptions associated with two SIMs share a single RF resource. In some wireless networks, a wireless communication device may have multiple subscriptions to one or more networks (e.g., by employing multiple subscriber identity module (SIM) cards or otherwise).

Wireless communication networks are widely deployed to provide various communication services such as voice, packet data, broadcast, messaging, and so on. These wireless networks may be capable of supporting communications for multiple users by sharing the available network resources. Such wireless networks may include CDMA networks, TDMA networks, FDMA networks, Orthogonal FDMA (OFDMA) networks, Single-Carrier FDMA (SC-FDMA) networks, etc. Technologies that may be implemented by such wireless communication networks may include Wireless networks may also utilize various radio technologies such as Wideband CDMA (WCDMA), CDMA2000, Global System for Mobile Communications (GSM), etc. For example, a CDMA network may implement Universal Terrestrial Radio Access (UTRA) (including Wideband CDMA (WCDMA) standards), CDMA2000 (including IS-2000, IS-95 and/or IS-856 standards), etc. In another example, a TDMA network may implement Global System for Mobile Communications (GSM). In another example, an OFDMA network may implement Evolved UTRA (E-UTRA) (including LTE standards), IEEE 802.11 (Wi-Fi), IEEE 802.16 (WiMAX), IEEE 802.20, Flash-OFDM®, etc. These multiple technologies have been adopted in various telecommunication standards to provide a common protocol that enables different wireless communication devices to communicate on a municipal, national, regional, and/or global level.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices. For clarity, various embodiments are described below for GSM-type and/or UMTS-type networks, but may be applied to networks using any other radio technology or protocol.

An example GSM network may operate on any of a number of GSM bands (e.g., GSM 900, GSM 850, etc.), each of which cover multiple radio frequency (RF) channels identified by absolute radio frequency channel numbers (ARFCNs). The ARFCNs for various GSM bands are given in 3GPP Technical Specification (TS) 05.05, entitled "Digital cellular telecommunications system (Phase 2+); Radio transmission and reception (Release 1999)." Further, each GSM network typically operates on a specific set of RF channels in a specific GSM band.

In describing various embodiments, the terms "channel," "frequency," and "ARFCN" may be used interchangeably and may refer to channels in GSM bands, and/or channels in other network bands (e.g., UTRA absolute radio frequency channel numbers (UARFCNs) for UMTS networks, LTE E-UTRA absolute radio frequency channel numbers (EARFCNs) for LTE networks, etc.).

The SIMs in a multi-SIM wireless communication device may be associated with the same or different public land mobile networks (PLMNs), each of which may have more than one wireless network. Each SIM is generally provisioned by a service provider with a list of preferred PLMNs from which the wireless communication device can receive service (e.g., a home PLMN (HPLMN) and roaming partner PLMNs). In some embodiments, the wireless device processor may access non-volatile memory associated with a given one of the SIMs to identify supported radio access technologies, and the corresponding enabled frequency bands (and ARFCNs/UARFCNs/EUARFCNs/channels in each band).

For clarity, references to "first" and "second" SIMs, networks, and subscriptions are arbitrary used only for ease of reference, as at any given time the tune-away operation may be performed from either SIM/network/subscription to the other SIM/network/subscription. Thus, references to "first" and "second" are not intended to refer to a particular radio access technology, SIM, or network, nor to imply an order or priority among the various SIM/network/subscriptions.

While the techniques and embodiments described herein relate to an MSMS wireless communication device configured with at least one GSM/GPRS SIM and/or GSM SIM, various embodiments may be extended to subscriptions on other radio access networks (e.g., 1xRTT/CDMA2000, Evolution Data Optimized (EV-DO), LTE, Worldwide Interoperability for Microwave Access (WiMAX), Wi-Fi, etc.). In that regard, the messages, physical and transport channels, radio control states, etc. referred to herein may also be known by other terms in various radio access technologies and standards. Further, the messages, channels, and control states may be associated with different timing in other radio access technologies and standards.

In various embodiments, an RF resource of an MSMS wireless communication device may be configured to be shared by a plurality of SIMs, but may be employed by default to perform communications on a first network enabled by a first SIM, such as a network capable of efficient data communications. As such, a modem stack associated with a second SIM of the device may often be in idle mode communicating only periodically with a second network, which may be the same or different from the first network. Depending on the radio access technology of the second network, such idle mode states may involve implementing a power-saving mode that includes a cycle of sleep and awake states. For example, if the second network is a GSM network, during idle mode the modem stack associated with the second SIM may implement discontinuous reception (DRX).

During a wake-up period (i.e., awake state), the timing of which may be set by the second network for a paging group to which the second SIM belongs, the modem stack associated with the second SIM may attempt to use the shared RF resource to monitor a paging channel of the second network, and/or perform measurements. During the sleep state, the modem stack may power off most processes and components, including the associated RF resource unless the RF resource is being used to support communications associated with another SIM.

Various embodiments may be implemented within a variety of communication systems, such as the example communication system 100 illustrated in FIG. 1. The communication system 100 may include one or more wireless communication devices 102, a telephone network 104, and network servers 106 coupled to the telephone network 104 and to the Internet 108. In some embodiments, the network server 106 may be implemented as a server within the network infrastructure of the telephone network 104.

A typical telephone network 104 includes a plurality of cell base stations 110 coupled to a network operations center 112, which operates to connect voice and data calls between the wireless communication devices 102 (e.g., tablets, laptops, cellular phones, etc.) and other network destinations, such as via telephone land lines (e.g., a plain old telephone system (POTS) network, not shown) and the Internet 108. The telephone network 104 may also include one or more servers 116 coupled to or within the network operations center 112 that provide a connection to the Internet 108 and/or to the network servers 106. Communications between the wireless communication devices 102 and the telephone network 104 may be accomplished via two-way wireless communication links 114, such as GSM, UMTS, EDGE, 4G, 3G, CDMA, TDMA, LTE, and/or other communication technologies.

Figure 2:
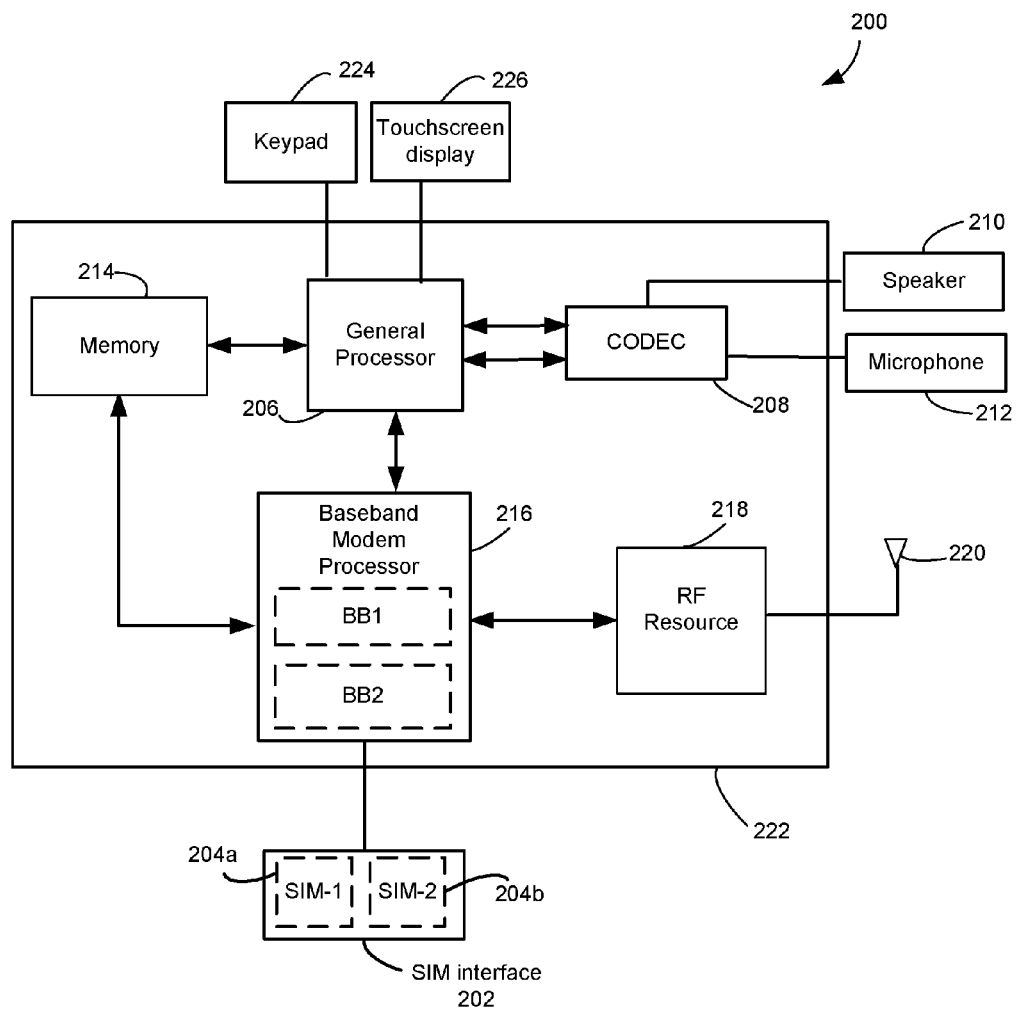
FIG. 2 is a block diagram illustrating a wireless communications device according to various embodiments.

FIG. 2 is a functional block diagram of an example wireless communication device 200 that is suitable for implementing various embodiments. With reference to FIGS. 1-2, the wireless communication device 200 may be similar to one or more of the wireless communication devices 102.

In various embodiments, the wireless communication device 200 may be a single-SIM device. In other embodiments, the wireless communication device 200 may be a multi-SIM device, such as MSMS wireless communication device. In some embodiments, the wireless communication device 200 may be a dual-SIM dual-standby (DSDS) device.

The wireless communication device 200 may include at least one SIM interface 202, which may receive at least a first SIM (SIM-1) 204a associated with a first subscription and a second SIM (SIM-2) 204b that is associated with a second subscription. In some embodiments, the at least one SIM interface 202 may be implemented as multiple SIM interfaces 202, which may receive at least a second SIM (SIM-2) 204b that is associated with at least a second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM 204a, 204b may have a CPU, ROM, RAM, EEPROM and I/O circuits. One or more of the first SIM 204a and the second SIM 204b used in various embodiments may contain user account information, an IMSI a set of SIM application toolkit (SAT) commands and storage space for phone book contacts. One or more of the first SIM 204a and the second SIM 204b may further store home identifiers (e.g., a System Identification Number (SID)/Network Identification Number (NID) pair, a Home PLMN (HPLMN) code, etc.) to indicate the SIM network operator provider. An Integrated Circuit Card Identity (ICCID) SIM serial number may be printed on one or more SIMs 204a, 204b for identification.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The memory 214 may be a non-transitory tangible computer readable storage medium that stores processor-executable instructions. For example, the instructions may include routing communication data relating to a subscription though a corresponding baseband-RF resource chain. The memory 214 may store operating system (OS) processor-executable instructions, as well as user application software executable instructions.

The general-purpose processor 206 and the memory 214 may each be coupled to at least one baseband-modem processor 216. Each SIM 204a, 204b in the wireless communication device 200 may be associated with a baseband-RF resource chain that includes at least one baseband-modem processor 216 and at least one RF resource 218. In some embodiments, the wireless communication device 200 may be a DSDS device, with both SIMs 204a, 204b sharing a single baseband-RF resource chain that includes the baseband-modem processor 216 and the RF resource 218. In some embodiments, the shared baseband-RF resource chain may include, for each of the first SIM 204a and the second SIM 204b, separate baseband-modem processor 216 functionality (e.g., BB1 and BB2). The RF resource 218 may be coupled to at least one antenna 220, and the RF resource 218 may perform transmit/receive functions for the wireless services associated with each SIM 204a, 204b of the wireless communication device 200. The RF resource 218 may implement separate transmit and receive functionalities or may include a transceiver that combines transmitter and receiver functions.

In particular embodiments, the general-purpose processor 206, memory 214, baseband-modem processor 216, and RF resource 218 may be included in a system-on-chip device 222. The first and second SIMs 204a, 204b and corresponding interface(s) 202 may be external to the system-on-chip device 222. Further, various input and output devices may be coupled to components of the system-on-chip device 222, such as interfaces or controllers. Example user input components suitable for use in the wireless communication device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software and functions in the wireless communication device 200 to enable communication between them, as is known in the art.

Figure 3:
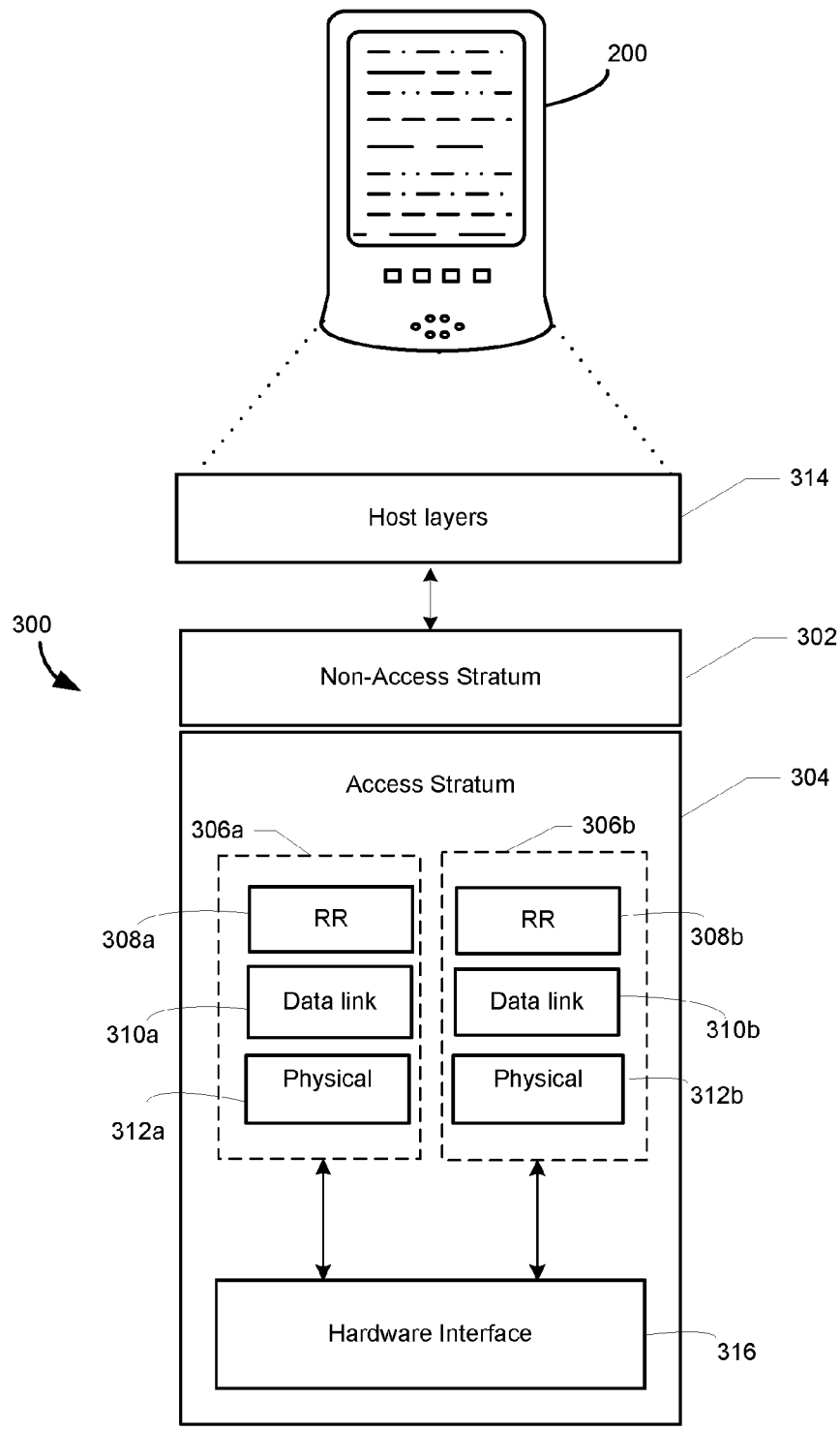
FIG. 3 is a system architecture diagram illustrating example protocol layer stacks implemented by a wireless communication device.

FIG. 3 illustrates a layered software architecture 300 of a wireless communication device supporting communicate over access networks associated with SIMs. With reference to FIGS. 1-3, the software architecture 300 of a wireless communication device (e.g., 102, 200) may be distributed among one or more processors, such as the baseband-modem processor 216. The software architecture 300 may also include a Non-Access Stratum (NAS) 302 and an Access Stratum (AS) 304. The NAS 302 may include functions and protocols to support traffic and signaling between SIMs of the wireless communication device 200 (e.g., first SIM/SIM-1 204a, second SIM/SIM-2 204b) and the core networks corresponding to each SIM. The AS 304 may include functions and protocols that support communications between the SIMs (e.g., first SIM 204a, second SIM 204b) and entities of the access networks corresponding to each SIM (such as a mobile switching center (MSC) if in a GSM network).

In the multi-SIM wireless communication device 200, the AS 304 may include multiple protocol stacks, each of which may be associated with a different SIM. For example, the AS 304 may include protocol stacks 306a, 306b, associated with the first and second SIMs 204a, 204b, respectively. Although described below with reference to GSM-type communication layers, protocol stacks 306a, 306b may support any of variety of standards and protocols for wireless communications. Each protocol stack 306a, 306b may respectively include radio resource (RR) management layers 308a, 308b. The RR layers 308a, 308b may be part of Layer 3 of a GSM signaling protocol and may oversee the establishment of a link between the wireless communication device 200 and associated access networks. In various embodiments, the NAS 302 and RR layers 308a, 308b may perform the various functions to search for wireless networks and to establish, maintain and terminate calls.

In some embodiments, each RR layer 308a, 308b may be one of a number of sub-layers of Layer 3. Other sub-layers may include, for example, mobility management (MM) sublayers to manage the location updating and registration procedures, and connection management (CM) sub-layers (not shown) that route calls, select a service type, prioritize data, perform QoS functions, etc.

Residing below the RR layers 308a, 308b, the protocol stacks 306a, 306b may also respectively include data link layers 310a, 310b, which may be part of Layer 2 in a GSM signaling protocol. The data link layers 310a, 310b may provide functions to handle incoming and outgoing data across the network, such as dividing output data into data frames and analyzing incoming data to ensure the data has been successfully received. In some embodiments, each data link layer 310a, 310b may contain various sub-layers. For example, a packet data convergence protocol (PDCP) sub-layer may provide multiplexing between difference radio bearers and logical channels. The PDCP sublayer may provide header compression for upper layer data packets to reduce radio transmission overhead, security by ciphering the data packets, and handover support between cell sites. Below the PDCP sublayer, a radio link control (RLC) sublayer may provide segmentation and reassembly of upper layer data packets, retransmission of lost data packets, and reordering of data packets to compensate for out-of-order reception due to hybrid automatic repeat request (HARQ).

Below the RLC sublayer, a media access control (MAC) sublayer may provide multiplexing between logical and transport channels. The MAC sublayer may also be responsible for allocating various radio resources (e.g., radio blocks) in one cell among various devices, and HARQ operations. Residing below the data link layers 310a, 310b, the protocol stacks 306a, 306b may also respectively include physical layers 312a, 312b, which may establish connections over the air interface and manage network resources for the wireless communication device 200.

While the protocol stacks 306a, 306b provide functions to transmit data through physical media, the software architecture 300 may further include at least one host layer 314 to provide data transfer services to various applications in the wireless communication device 200. In some embodiments, application-specific functions provided by the at least one host layer 314 may provide an interface between the protocol stacks 306a, 306b and the general-purpose processor 206. In alternative embodiments, the protocol stacks 306a, 306b may each include one or more higher logical layers (e.g., transport, session, presentation, application, etc.) that provide host layer functions. In some embodiments, the software architecture 300 may further include in the AS 304 a hardware interface 316 between the physical layers 312a, 312b and the communication hardware (e.g., one or more RF resource).

In various embodiments, the protocol stacks 306a, 306b of the layered software architecture may be implemented to allow modem operation using information provisioned on multiple SIMs. Therefore, a protocol stack that may be executed by a baseband-modem processor is interchangeably referred to herein as a modem stack.

Although described below with reference to GSM-type communication layers, the modem stacks in various embodiments may support any of a variety of current and/or future protocols for wireless communications. For examples, the modem stacks in various embodiments may support networks using other radio access technologies described in 3GPP standards (e.g., UMTS, Long Term Evolution (LTE), etc.), 3GPP2 standards (e.g., 1×RTT/CDMA2000, Evolved Data Optimized (EV-DO), Ultra Mobile Broadband (UMB), etc.) and/or IEEE standards Worldwide Interoperability for Microwave Access (WiMAX), Wi-Fi, etc.).

In a conventional GSM system, a wireless communication device may attempt to be assigned a dedicated channel resource by sending a resource request message to a base station of a network. For example, a wireless communication device (or modem stack associated with a SIM in the wireless communication device) may initiate a communication to another wireless communication device (e.g., a mobile terminating call, data session for transmitting and receiving packets, etc.) by requesting a connection to the network associated with that SIM.

The GSM standard employs a multiple access scheme that defines how simultaneous communication can occur between different wireless communication devices and base stations. Within each cell, a combination of FDMA and time division multiple access (TDMA) techniques are employed by the standard. Specifically, the available spectrum is divided into carrier frequencies of 200 kHz bandwidth, with pairs of carriers that are 45 MHz apart from each other identified by an absolute radio-frequency channel number (ARFCN). Each pair of carrier frequencies (one uplink, one downlink) is also divided into eight time slots (e.g., TS0 through TS7) using TDMA such that eight consecutive time slots form one TDMA frame, lasting approximately 4.615 ms. In this manner individual physical channels may be formed, each of which correspond to a particular carrier frequency and time slot number.

Logical channels may be mapped to the physical channels, and categorized by the information carried. Specifically, control channels may carry signaling or synchronization data to or from group including a particular wireless communication device (or modem stack associated with a SIM of the device). In various embodiments, a wireless communication device may be assigned a time slot in which the group including the device may receive messages on TDMA frames carrying common control channels. Therefore, the wireless communication device may be configured to receive and decode only the bursts within that timeslot, which is repeated after the other seven time slots of the TDMA frame (e.g., totally around 4.03 ms).

Mechanisms for establishing and assigning a dedicated channel for communications in GSM are radio resource establishment procedures specified in Section 3.3 of 3GPP TS 04.08 entitled "Digital cellular telecommunications system (Phase 2+); Mobile radio interface layer 3 specification (Release 1999)." The General packet radio service (GPRS) is a packet oriented mobile data service in GSM, for which the radio resource establishment procedures are specified in 3GPP TS 44.160 "General Packet Radio Service (GPRS); Mobile Station (MS)-Base Station System (BSS) interface;

Radio Link Control/Medium Access Control (RLC/MAC) protocol for Iu mode (Release 10)."

Channels in GSM are configured by grouping information across TDMA frames to create 51-TDMA frame control multiframes, and 26-TDMA frame traffic multiframes. In each TDMA frame, control channel information is generally carried in the first time slot (time slot 0), with time slots 1 through 7 used for traffic channels. Control channels in GSM include a frequency correction channel (FCCH), a synchronization channel (SCH), a broadcast control channel (BCCH), and a common control channel (CCCH). In conventional GSM wireless communications, the FCCH carries information used by a wireless communication device for frequency correction and is sent in TDMA frames 0, 10, 20, 30 and 40 of each multiframe. The SCH carries a reduced TDMA frame number (RFN) used by a wireless communication device to synchronize timing and frame numbering, as well as a base transceiver station identity code (BSIC) used to identify the transmitting base station. The SCH is typically sent in TDMA frames 1, 11, 21, 31 and 41 of each multiframe.

System information in GSM is typically carried by the BCCH in TDMA frames 2, 3, 4 and 5 of each multiframe. The CCCH carries control information, and may be used to implement a paging channel (PCH) for carrying paging messages. For example, a paging message may notify a wireless communication device of an incoming (i.e., mobile terminating) call. The CCCH includes nine radio blocks in each multiframe, with each radio block spanning four consecutive TDMA frames. In various embodiments, CCCH radio blocks that are used for the paging channel are referred to as "paging blocks," each of which may carry one paging message. Further channel configurations for the control channels in GSM are specified in GSM standards, such as 3GPP Technical Specification (TS) 05.01 version 8.9.0 entitled "GSM/EDGE Radio Access Network; Physical layer on the radio path; General description" (November 2004), the details of which are incorporated by reference herein.

The paging channel may be divided into N paging groups, where N is the number of paging blocks available in one CCCH, and typically ranges from 2 to 9. Each paging group is associated with one paging block that occurs every Nth multiframe. A wireless communication device is typically assigned to a specific paging group, which is determined based on the IMSI and the number of paging groups N. Paging messages (if any) may be sent to the wireless communication device in the paging blocks for the assigned paging group. Typically, during idle mode the wireless communication device may enter an awake state to receive paging messages sent in the paging blocks associated with the assigned paging group, and remain in a sleep state for the remainder of the time to conserve battery power.

In GSM, system information messages may be transmitted in time slots on the BCCH or on the SACCH, in a cyclic order, in a pattern that repeats every eight multiframes. As described in further detail, full system information is transmitted in system information messages that are non-consecutively numbered between 1 and 20 (e.g., types 10, 11, 12, 14 and 15 are currently not used). When powered on or whenever coverage is lost, a terminal searches for suitable cells from which the terminal may receive service. If a suitable cell is found and if the terminal is in the idle mode, then the terminal camps on the cell and receives paging messages sent by this cell in paging blocks. This cell is referred to as the terminal's current serving cell.

While camped on a given cell, the wireless communication device may monitor signals from neighboring cells, as well as current conditions in the serving cell. Processes for monitoring/evaluating neighbor cells may be performed continuously when the wireless communication device is in idle mode, following initial cell selection (i.e., acquisition and camping). A conventional wireless communication device may calculate the received-chip-energy-to-noise ratio or signal strength, and/or other quality measurements to determine if a change to a new cell is required. For example, the wireless communication device may calculate a selection value for neighbor cells based on the minimum required quality in the neighbor cell and the maximum transmission power, which are read from system information (i.e., cell selection parameters). If a change to a new cell is required, such as because signals from one of the neighbor cells is stronger than that of the serving cell or because of network conditions/priorities, the wireless communication device may check to ensure no restrictions exist that would prevent using the new cell as a target cell, which information may be read in a part of the system information. If no restrictions exist, a cell reselection to the target cell may be invoked on the wireless communication device, followed by location update as required.

Cell reselection in idle mode for GSM may involve obtaining necessary measurements to determine that a reselection to a new cell is needed, tuning to a frequency of the new cell (i.e., target cell), and reading the required system information, and starting to receive paging messages in the new cell. Reading the required system information may involve, for example, decoding channels carrying the frequency offset and timing of the target cell, and decoding channels carrying the system information associated with the target cell. In various situations, the neighbor cells may use the same radio access technology (RAT) as the serving cell (e.g., GSM) or a different RAT (e.g., UMTS/WCDMA). For example, each GSM cell that supports Release 99 or a later version of the GSM standard, and each 3GPP cell, typically broadcasts a neighbor cell list that may contain up to 32 GSM cells and up to 64 WCDMA neighbor cells distributed across up to three WCDMA frequencies. For the GSM cells, the neighbor cell list contains the ARFCN of the BCCH carrier and the BSIC. For cells using other technologies, such as WCDMA, additional information (e.g., a primary scrambling code) may be included in order to enable the device to determine quality of the cell Alternatively, if recovering from an out of service state on a SIM, the wireless communication device may first select a public land mobile network (PLMN). Following PLMN selection, the wireless communication device may perform initial cell selection in the PLMN by receiving broadcast information from a target cell in a similar manner as for reselection. In some circumstances, the target cell may belong to the selected PLMN.

During conventional cell reselection, the wireless communication device receives paging messages from the serving cell until the reselection decision is made, and receives paging messages from the new cell after full system information is read, but not during the time that system information is being read for the target cell. Further, during conventional initial cell selection, the wireless communication device does not begin receiving paging message until after full system information is read. Therefore, the wireless communication device may not receive paging messages during the time that the device is obtaining full system information for the target cell, which may take from approximately one to ten seconds in GSM. As such, paging messages to the SIM performing cell reselection or initial cell selection may be missed, delaying service for mobile terminating calls on the idle mode SIM(s), and thereby degrading performance.

Early camping is a technique that may be utilized to minimize the delay in service that can occur from initial cell selection or cell reselection. Specifically, a wireless communication device (or modem stack associated with a SIM of the wireless communication device) may perform early camping during initial cell selection or cell reselection by monitoring for paging messages in the target cell as soon as sufficient system information is received to process the paging channel instead of waiting for the full system information.

As described, full system information may be transmitted in pieces using different types of system information messages. Each system information message may carry certain system information, and be sent at specific times (i.e., at known TDMA frames). Further, different system information messages are typically transmitted at different intervals, ranging from approximately once every second to once every ten seconds. For example, in GSM a system information type 3 message (SI3) carries information needed to perform cell reselection and receive paging messages from a cell (e.g., to determine the paging blocks for the wireless communication device, as assigned by the cell). SI3 may be sent at a rate of approximately once every second. A system information type 4 message (SI4) carries information needed to perform cell reselection, but does not contain information necessary to receive paging messages.

The wireless communication device is generally not permitted to transmit on the uplink until the device has obtained the full system information for the target cell, which may take from around 1 second to around 10 seconds in a GSM network. Using early camping, a wireless communication device (or modem stack associated with a SIM of the wireless communication device) may start monitoring the paging channel for messages to the device or SIM from the target cell after obtaining SI3. Since SI3 is sent more frequently than other types of system information, SI3 may be obtained much sooner than the full system information. If a paging message is received from the target cell, the wireless communication device may save the message to be processed after completion of initial cell selection or cell reselection to the target cell is complete. The wireless communication device may therefore reduce the chance of missing a paging message during the initial cell selection or cell resection.

Upon receiving the full system information for a target cell, the initial cell selection or cell reselection process may be complete, and the wireless communication device may be camped on a new serving cell that was the target cell. The wireless communication device may respond to paging messages (if any) received from the new cell since the selection was started or the reselection decision was made, or continue to camp on the new cell if no actions are required. In any case, the terminal continues to receive paging messages from the new cell in paging blocks, as assigned by the new cell.

When access to an RF resource is shared between multiple subscriptions, some of the remaining system information for the second SIM may not be received due to overlap/collision between the time slots in TDMA frames during which such system information is broadcast and higher priority communication/activity on a second SIM. Therefore, a paging message for the first SIM that has been saved cannot be processed, and therefore may be discarded.

As a result, the receipt of mobile terminating calls (i.e., incoming calls) on the wireless communication device may be degrading, which may impact the user experience.

As described, during an active communication on a modem stack associated with a first SIM, initial cell selection or cell resection may still be performed on a modem stack associated with the second SIM. That is, the RF resource may continue to monitor system information from, and maintain a connection with, the serving network of the second SIM, such as by implementing an idle mode that uses discontinuous reception on the second SIM. To perform communication activities associated with the second SIM (e.g., idle mode activities during a wake-up period of the DRX cycle) the RF resource may tune away from the communication on the first SIM and to the network for the second SIM, followed by tuning back to the communication on the first SIM. Based on the limited use of the RF resource typically granted to the modem stack associated with a SIM in idle mode, some of the remaining system information for the second SIM following early camping may not be received due to overlap between the time slots in TDMA frames during which such system information is broadcast.

Various embodiments may reduce the impact on call performance on a MSMS wireless communication device that is using early camping for initial cell selection or cell reselection during an active communication on a subscription supported by another SIM. Specifically, if a paging message is received for the modem stack associated with the SIM performing initial cell selection or cell reselection, the received paging message may be saved on the MSMS wireless communication device if full system information has not been received from the target cell.

In order to avoid any tune-away by the RF resource to another SIM, the priority for the SIM performing the initial cell selection or cell reselection may be artificially raised in order to allow full system information to be received from the target cell without interruption or tune-aways. Once the full system information is received for the new cell, priority of the first SIM activity is lowered back to the initial level, allowing the RF resource allocation through the time-sharing/arbitration mechanism implemented by the scheduling module to revert to normal. Subsequently, the device may process the saved paging message that was received for the first SIM.

Figure 4A:
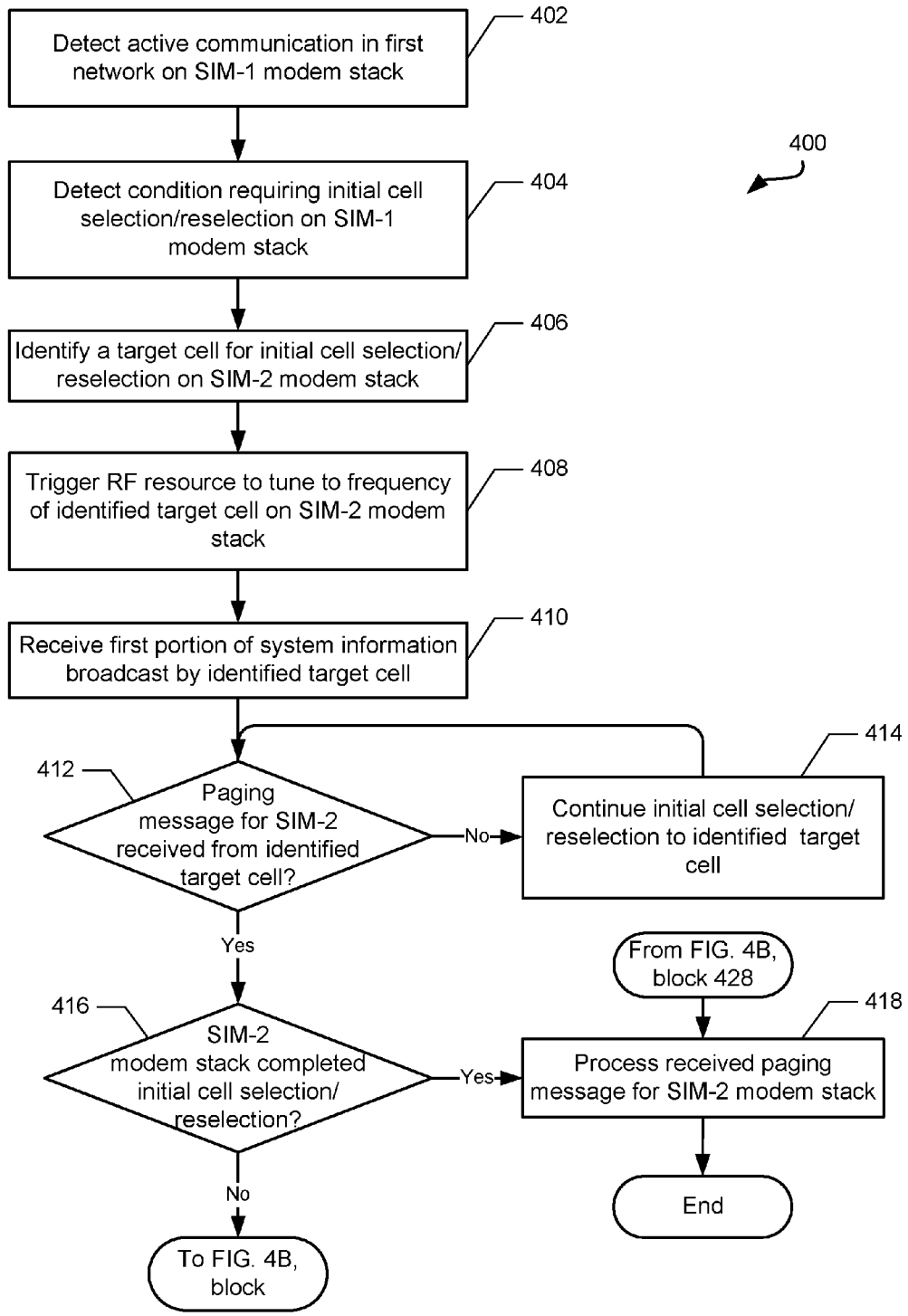
FIGS. 4A-4B are process flow diagrams illustrating a method for avoiding degradation of call performance due to initial cell selection or cell reselection on a multi-SIM wireless communication device according to various embodiments.
Figure 4B:
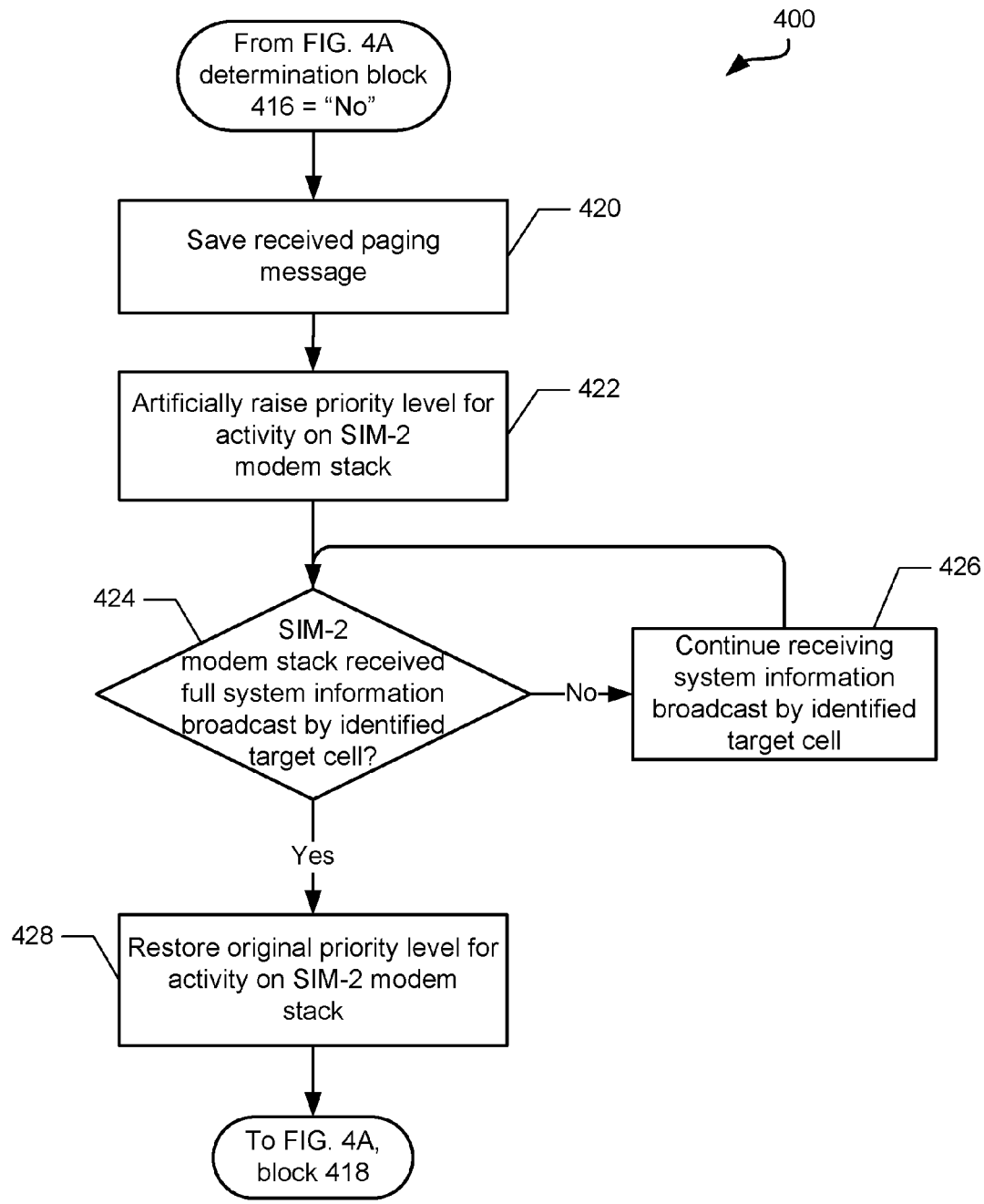

FIGS. 4A-4B illustrate a method 400 for improving performance on a multi-SIM multi-standby wireless communication device during an active communication supported by a first SIM and an initial cell selection or cell reselection procedure supported by a second SIM according to various embodiments.

With reference to FIGS. 1-4B, the multi-SIM multi-standby device (e.g., 102, 200) may be configured with a single shared RF resource (e.g., 218). In various embodiments, the operations of the method 400 may be implemented by one or more processors of the wireless communication device, such as a general-purpose processor (e.g., 206) and/or baseband-modem processor (e.g., 216). In various embodiments, the operations of the method 400 may be implemented by a separate controller (not shown) that may be coupled to memory (e.g., 214) and to the one or more processors.

In block 402, the wireless device processor may detect that a modem stack associated with a first SIM ("SIM-1") is participating in an active communication on a first network supported by the first SIM. In some embodiments, the active communication may involve, for example, a voice call, a data session, etc., and may involve using one or more of a variety of radio access technologies to communicate with the first network (e.g., WCDMA/UMTS, EDGE, LTE, etc.).

In block 404, the wireless communication device processor may detect a condition requiring an initial cell selection or cell reselection on a modem stack associated with a second SIM ("SIM-2"). For example, as a result of the active communication on the modem stack associated with the first SIM, the modem stack associated with the second SIM may be camped in idle mode on a serving cell of a second network supported by the second SIM. During idle mode, the modem stack associated with the second SIM may periodically receive information used to evaluate whether a neighbor cell would be better to camp on and receive service from than the serving cell.

In some circumstances, reselection to a new cell (i.e., a target cell) may be triggered if the received signal level for any neighbor is better than that of the current serving cell for a period of time (e.g., at least five seconds in a GSM system). In other circumstances, recovery from an out-of-service state for the second SIM may require initial cell selection on the modem stack associated with the second SIM. In recovering from an out of service state on a SIM, the MSMS wireless communication device may select a public land mobile network (PLMN), and receive broadcast information from nearby cells transmitting signals above a threshold strength.

In block 406, the wireless communication device processor may identify a target cell for the initial cell selection or cell reselection on the modem stack associated with the second SIM. For example, the identified target cell may be the neighbor cell triggering cell reselection, or may be a cell that belongs to a selected PLMN. In various embodiments, identifying the target cell may be based on various cell selection parameters and/or criteria, for example, cell quality measurements, PLMN identity, radio access technology (RAT), etc.

In block 408, the wireless device processor may trigger the RF resource to tune to the frequency of the identified target cell on the modem stack associated with the second SIM. In some embodiments, the required initial cell selection or cell reselection may be performed during a wake-up period(s) of the power-saving mode cycle on the modem stack associated with the second SIM.

In block 410, the wireless device processor may receive a first portion of the system information broadcast by the identified target cell. In various embodiments, the first portion of the system information may be sufficient system information to process a paging channel for the identified target cell (e.g., system information message SI3 for GSM systems). Upon receiving the first portion of the system information, the wireless device processor may begin to monitor the paging channel for messages to the second SIM. That is, the wireless device processor may receive signals broadcast by the identified target cell during a timeslot assigned to a paging group of the second SIM.

In determination block 412, the wireless communication device processor may determine whether a paging message to the second SIM is received from the identified target cell. So long as no paging message to the second SIM is received (i.e., determination block 412="No"), the wireless device processor may continue the initial cell selection or cell reselection in block 414.

In response to determining that a paging message to the second SIM is received from the identified target cell (i.e., determination block 414="Yes"), the wireless device processor may determine whether the modem stack associated with the second SIM has completed the initial cell selection or cell reselection to the identified target cell in determination block 416.

In response to determining that the modem stack associated with the second SIM has completed the initial cell selection or cell reselection to the identified target cell (i.e., determination block 416="Yes"), the wireless device processor may process the received paging message for the second SIM in block 418. For example, the received paging message may be decoded on the modem stack associated with the second SIM, and the wireless communication device may perform various operations to respond based on the content of the message. For example, if a notification of a mobile terminating call to the second SIM is received, the wireless device processor may use various criteria and/or settings a number of to handle priority between the call and the active communication on the modem stack associated with the first SIM.

In response to determining that the modem stack associated with the second SIM has not completed the initial cell selection or cell reselection to the identified target cell (i.e., determination block 416="No"), the wireless device processor may save the received paging message in block 420.

The wireless device processor may artificially raise a priority level for activity on the modem stack associated with the second SIM in block 422. In various embodiments, such priority level may be associated with the time-sharing/arbitration mechanism employed to schedule use of the RF resource. That is, the modem stack associated with the second SIM may be given continued access to the RF resource on the modem stack associated with the second SIM. In this manner, the modem stack associated with the second SIM is able to receive the remaining system information broadcast by the identified target cell, regardless of the priority of conflicting activity on another modem stack (e.g., the active communication on the modem stack associated with the first SIM). In various embodiments, an indication of the raised priority associated with the activity on the second SIM may be passed to an RF resource scheduler. The RF resource scheduler may use any of a number of algorithms to control time-sharing/arbitration among SIMs for access to the RF resource.

In determination block 424, the wireless device processor may determine whether the modem stack associated with the second SIM has received full system information broadcast by the identified target cell. So long as the modem stack associated with the second SIM has not received full system information broadcast by the identified target cell (i.e., determination block 424="No"), the wireless device processor may continue to receive the system information broadcast by the identified target cell in block 426.

In response to determining that the modem stack associated with the second SIM has received full system information broadcast by the identified target cell (i.e., determination block 424="Yes"), the wireless communication device processor may restore the original priority level for the activity on the modem stack associated with the second SIM in block 428. In this manner, access to the RF resource as determined through the time-sharing/arbitration algorithms implemented by the RF resource scheduler may revert to normal. The wireless communication device processor may process the received paging message for the second SIM in block 418, followed by any of a variety of actions to handle content of the paging message.

Figure 5:
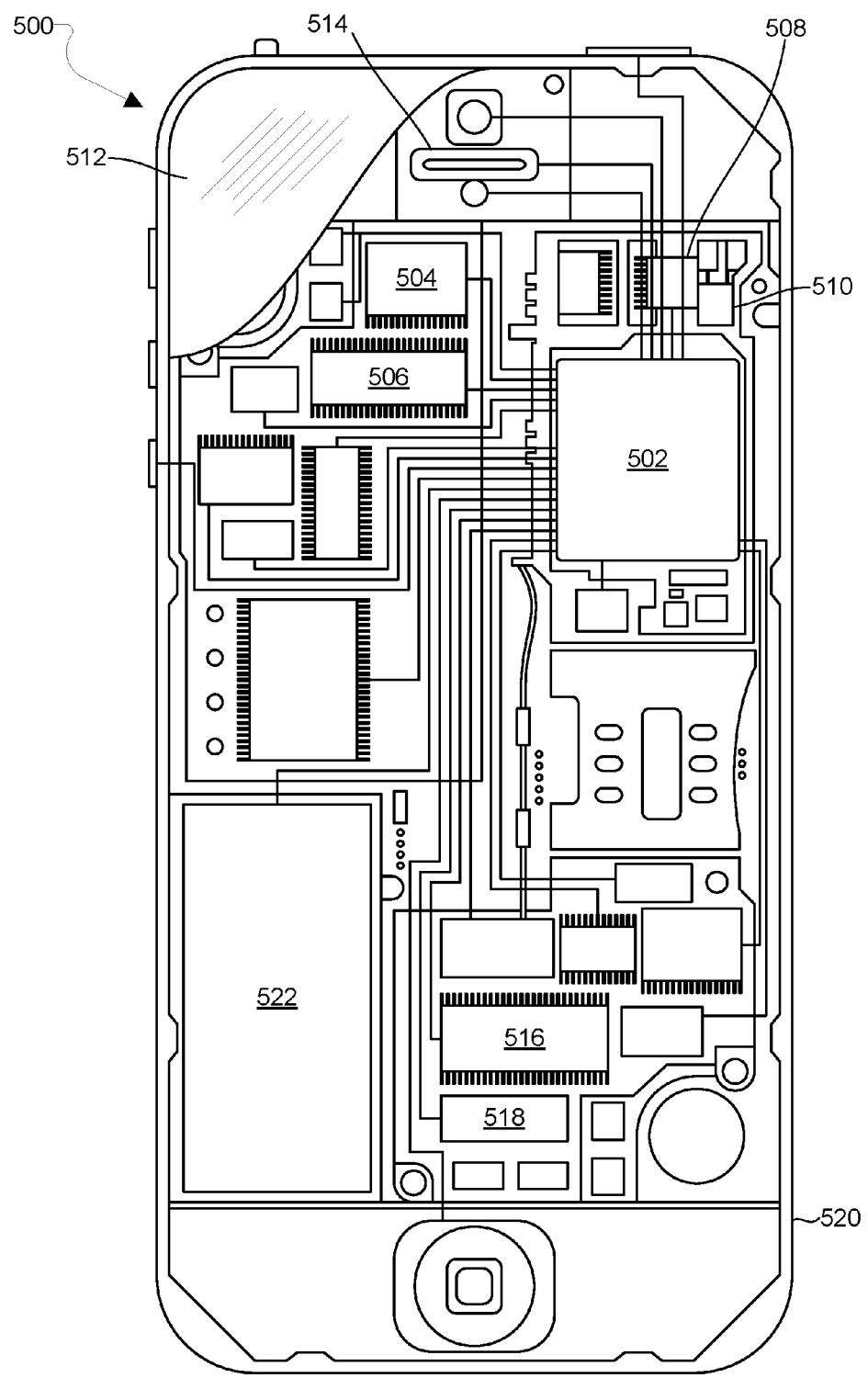
FIG. 5 is a component diagram of an example wireless communication device suitable for use with various embodiments.

Various embodiments (including, but not limited to, the embodiments discussed with reference to FIGS. 4A-4B), may be implemented in any of a variety of wireless communication devices, an example of which is illustrated in FIG. 5. For example, with reference to FIGS. 1-5, a wireless communication device 500 (which may correspond, for example, the wireless communication devices 102, 200 in FIGS. 1-2) may include a processor 502 coupled to a touchscreen controller 504 and an internal memory 506. The processor 502 may be one or more multicore integrated circuits (ICs) designated for general or specific processing tasks. The internal memory 506 may be volatile or nonvolatile memory, and may also be secure and/or encrypted memory, or unsecure and/or unencrypted memory, or any combination thereof.

The touchscreen controller 504 and the processor 502 may also be coupled to a touchscreen panel 512, such as a resistive-sensing touchscreen, capacitive-sensing touchscreen, infrared sensing touchscreen, etc. The wireless communication device 500 may have one or more radio signal transceivers 508 (e.g., Peanut®, Bluetooth®, ZigBee®, Wi-Fi, RF radio) and antennae 510, for sending and receiving, coupled to each other and/or to the processor 502. The transceivers 508 and antennas 510 may be used with circuitry (e.g., 502, 504, 512) in various embodiments to implement the various wireless transmission protocol stacks and interfaces. The wireless communication device 500 may include a cellular network wireless modem chip 516 that enables communication via a cellular network and is coupled to the processor.

The wireless communication device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The wireless communication device 500 may also include speakers 514 for providing audio outputs. The wireless communication device 500 may also include a housing 520, constructed of a plastic, metal, or a combination of materials, for containing all or some of the components discussed herein. The wireless communication device 500 may include a power source 522 coupled to the processor 502, such as a disposable or rechargeable battery. The rechargeable battery may also be coupled to the peripheral device connection port to receive a charging current from a source external to the wireless communication device 500.

Figure 6:
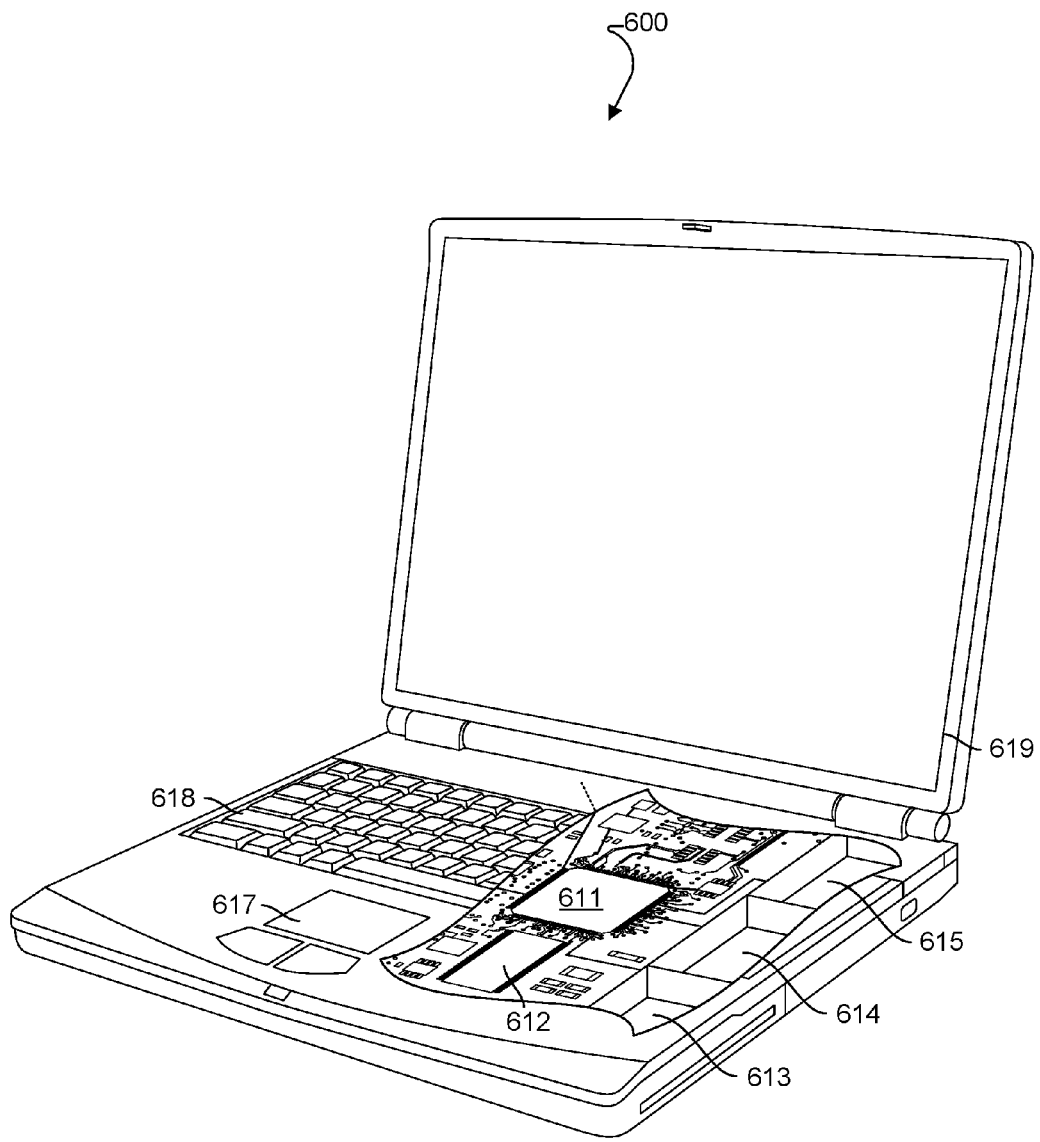
FIG. 6 is a component diagram of another example wireless communication device suitable for use with various embodiments.

Various embodiments (including, but not limited to, the embodiments discussed with reference to FIG. 4), may also be implemented within a variety of personal computing devices, an example 600 of which is illustrated in FIG. 6. With reference to FIGS. 1-6, the laptop computer 600 (which may correspond, for example, to the wireless communication devices 102,200 in FIGS. 1-3) may include a touchpad touch surface 617 that serves as the computer's pointing device, and thus may receive drag, scroll, and flick gestures similar to those implemented on wireless computing devices equipped with a touchscreen display as described. A laptop computer 600 will typically include a processor 611 coupled to volatile memory 612 and a large capacity nonvolatile memory, such as a disk drive 613 of Flash memory. The computer 600 may also include a floppy disc drive 614 and a compact disc (CD) drive 615 coupled to the processor 611. The computer 600 may also include a number of connector ports coupled to the processor 611 for establishing data connections or receiving external memory devices, such as a universal serial bus (USB) or FireWire® connector sockets, or other network connection circuits for coupling the processor 611 to a network. In a notebook configuration, the computer housing includes the touchpad 617, the keyboard 618, and the display 619 all coupled to the processor 611. Other configurations of the computing device may include a computer mouse or trackball coupled to the processor (e.g., via a USB input) as are well known, which may also be used in conjunction with various embodiments.

With reference to FIGS. 1-6, the processors 502 and 611 may be any programmable microprocessor, microcomputer or multiple processor chip or chips that can be configured by software instructions (applications) to perform a variety of functions, including the functions of various embodiments as described. In some devices, multiple processors may be provided, such as one processor dedicated to wireless communication functions and one processor dedicated to running other applications. Typically, software applications may be stored in the internal memory 506, 612 and 613 before they are accessed and loaded into the processors 502 and 611. The processors 502 and 611 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 502, 611, including internal memory or removable memory plugged into the device and memory within the processor 502 and 611, themselves.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit various embodiments to a particular order, sequence, type of network or carrier.

The various illustrative logical blocks, resources, circuits, and algorithm operations described in connection with various embodiments disclosed herein may be implemented as electronic hardware, computer software, or combinations of both. To clearly illustrate this interchangeability of hardware and software, various illustrative components, blocks, resources, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, resources, and circuits described in connection with the aspects disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiment, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in processor-executable software which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of improving performance of a multi-subscriber identity module (SIM) wireless communication device having at least a first SIM and a second SIM sharing a radio frequency (RF) resource, the method comprising:
   detecting an active communication in a first network on a modem stack associated with the first SIM;
   detecting a condition requiring initial cell selection or cell reselection on a modem stack associated with the second SIM;
   triggering the RF resource to tune to a frequency of an identified target cell in a second network on the modem stack associated with the second SIM, wherein the active communication is maintained on the modem stack associated with the first SIM;
   receiving a first portion of system information broadcast by the identified target cell, wherein the first portion of system information is sufficient to receive paging messages from the identified target cell;
   determining whether initial cell selection or cell reselection to the identified target cell is complete in response to receiving a paging message for the second SIM; and
   in response to determining that initial cell selection or reselection to the identified target cell is not complete:
      saving the received paging message; and
      raising a priority level for activity on the modem stack associated with the second SIM, wherein the priority level is used to arbitrate access to the RF resource between the first SIM and the second SIM.

2. The method of claim 1, wherein raising the priority level for activity on the modem stack associated with the second SIM comprises passing an indication of high priority to a scheduler for the RF resource.

3. The method of claim 1, wherein raising the priority level for activity on the modem stack associated with the second SIM comprises indicating a priority that is sufficiently high to supersede a priority level of activity on the first SIM.

4. The method of claim 1, further comprising;
   identifying a target cell for initial cell selection or cell reselection in the second network based on at least one of:
      channel conditions of a serving cell for the modem stack associated with the second SIM;
      quality of signals broadcast by neighbor cells; and
      a public land mobile network (PLMN) selected for the modem stack associated with the second SIM.

5. The method of claim 1,
   wherein the modem stack associated with the second SIM is camped in idle mode on a serving cell in the second network, and
   wherein triggering the RF resource to tune to the frequency of the identified target cell in the second network is performed during a wake-up period of a power-saving mode cycle associated with the second network.

6. The method of claim 1, further comprising, in response to determining that initial cell selection or reselection to the identified target cell is not complete:
   determining whether full system information broadcast by the identified target cell has been received; and
   returning the priority level for activity on the second SIM to an original level in response to determining that the full system information broadcast by the identified target cell has been received.

7. The method of claim 6, further comprising processing the saved paging message for the second SIM in response to determining that the full system information broadcast by the identified target cell has been received.

8. The method of claim 7, further comprising:
   determining whether the paging message indicates that a mobile terminating call to the second SIM is pending; and
   cancelling or suspending the active communication on the modem stack associated with the first SIM in response to determining that the paging message indicates that a mobile terminating call to the second SIM is pending.

9. The method of claim 1, wherein the identified target cell belongs to a Global Mobile Communications (GSM) network, and wherein receiving the first portion of system information broadcast by the identified target cell comprises receiving at least a system information message type 3 (SI3).

10. A wireless communication device, comprising:
a radio frequency (RF) resource configured to connect to at least a first subscriber identity module (SIM) and a second SIM; and
a processor coupled to the RF resource and configured with processor executable instructions to:
  detect an active communication in a first network on a modem stack associated with the first SIM;
  detect a condition requiring initial cell selection or cell reselection on a modem stack associated with the second SIM;
  trigger the RF resource to tune to a frequency of an identified target cell in a second network on the modem stack associated with the second SIM, wherein the active communication is maintained on the modem stack associated with the first SIM;
  receive a first portion of system information broadcast by the identified target cell, wherein the first portion of system information is sufficient to receive paging messages from the identified target cell;
  determine whether initial cell selection or cell reselection to the identified target cell is complete in response to receiving a paging message for the second SIM; and
  in response to determining that initial cell selection or reselection to the identified target cell is not complete:
    save the received paging message; and
    raise a priority level for activity on the modem stack associated with the second SIM, wherein the priority level is used to arbitrate access to the RF resource between the first SIM and the second SIM.

11. The wireless communication device of claim 10, wherein the processor is further configured with processor-executable instructions to raise the priority level for activity on the modem stack associated with the second SIM by passing an indication of high priority to a scheduler for the RF resource.

12. The wireless communication device of claim 10, wherein the processor is further configured with processor-executable instructions to raise the priority level for activity on the modem stack associated with the second SIM by indicating a priority that is sufficiently high to supersede a priority level of activity on the first SIM.

13. The wireless communication device of claim 10, wherein the processor is further configured with processor-executable instructions to:
  identify a target cell for initial cell selection or cell reselection in the second network based on at least one of:
    channel conditions of a serving cell for the modem stack associated with the second SIM;
    quality of signals broadcast by neighbor cells; and
    a public land mobile network (PLMN) selected for the modem stack associated with the second SIM.

14. The wireless communication device of claim 10, wherein the modem stack associated with the second SIM is camped in idle mode on a serving cell in the second network; and
wherein the processor is further configured with processor-executable instructions to trigger the RF resource to tune to the frequency of the identified target cell in the second network during a wake-up period of a power-saving mode cycle associated with the second network.

15. The wireless communication device of claim 10, wherein the processor is further configured with processor-executable instructions to, in response to determining that initial cell selection or reselection to the identified target cell is not complete:
  determine whether full system information broadcast by the identified target cell has been received; and
  return the priority level for activity on the second SIM to an original level in response to determining that the full system information broadcast by the identified target cell has been received.

16. The wireless communication device of claim 15, wherein the processor is further configured with processor-executable instructions to process the saved paging message for the second SIM in response to determining that the full system information broadcast by the identified target cell has been received.

17. The wireless communication device of claim 16, wherein the processor is further configured with processor-executable instructions to:
  determine whether the paging message indicates that a mobile terminating call to the second SIM is pending; and
  cancel or suspend the active communication on the modem stack associated with the first SIM in response to determining that the paging message indicates that a mobile terminating call to the second SIM is pending.

18. The wireless communication device of claim 10, wherein the identified target cell belongs to a Global Mobile Communications (GSM) network, and wherein receiving the first portion of system information broadcast by the identified target cell comprises receiving at least a system information message type 3 (SI3).

19. A wireless communication device, comprising:
a radio frequency (RF) resource associated with at least a first subscriber identity module (SIM) and a second SIM;
means for detecting an active communication in a first network on a modem stack associated with the first SIM;
means for detecting a condition requiring initial cell selection or cell reselection on a modem stack associated with the second SIM;
means for triggering the RF resource to tune to a frequency of an identified target cell in a second network on the modem stack associated with the second SIM, wherein the active communication is maintained on the modem stack associated with the first SIM;
means for receiving a first portion of system information broadcast by the identified target cell, wherein the first portion of system information is sufficient to receive paging messages from the identified target cell;
means for determining whether initial cell selection or cell reselection to the identified target cell is complete in response to receiving a paging message for the second SIM; and
means for saving the received paging message and raising a priority level for activity on the modem stack associated with the second SIM in response to determining that initial cell selection or reselection to the identified target cell is not complete, wherein the priority level is used to arbitrate access to the RF resource between the first SIM and the second SIM.

20. A non-transitory processor-readable storage medium having stored thereon processor-executable instructions configured to cause a processor of a wireless communication device having a radio frequency (RF) resource configured to connect to at least a first subscriber identity module (SIM) and a second SIM to perform operations comprising:
  detecting an active communication in a first network on a modem stack associated with the first SIM;
  detecting a condition requiring initial cell selection or cell reselection on a modem stack associated with the second SIM;
  triggering the RF resource to tune to a frequency of an identified target cell in a second network on the modem stack associated with the second SIM, wherein the active communication is maintained on the modem stack associated with the first SIM;
  receiving a first portion of system information broadcast by the identified target cell, wherein the first portion of system information is sufficient to receive paging messages from the identified target cell;
  determining whether initial cell selection or cell reselection to the identified target cell is complete in response to receiving a paging message for the second SIM; and
  in response to determining that initial cell selection or reselection to the identified target cell is not complete:
    saving the received paging message; and
    raising a priority level for activity on the modem stack associated with the second SIM, wherein the priority level is used to arbitrate access to the RF resource between the first SIM and the second SIM.

21. The non-transitory processor-readable storage medium of claim 20, wherein the stored processor-executable instructions are configured to cause the processor of the wireless communication device to perform operations such that raising the priority level for activity on the modem stack associated with the second SIM comprises indicating a priority that is sufficiently high to supersede a priority level of activity on the first SIM.

22. The non-transitory processor-readable storage medium of claim 20, wherein the stored processor-executable instructions are configured to cause the processor of the wireless communication device to perform operations further comprising:
  identifying a target cell for initial cell selection or cell reselection in the second network based on at least one of:
    channel conditions of a serving cell for the modem stack associated with the second SIM;
    quality of signals broadcast by neighbor cells; and
    a public land mobile network (PLMN) selected for the modem stack associated with the second SIM.

23. The non-transitory processor-readable storage medium of claim 20, wherein the stored processor-executable instructions are configured to cause the processor of the wireless communication device to perform operations such that:
  the modem stack associated with the second SIM is camped in idle mode on a serving cell in the second network; and
  triggering the RF resource to tune to the frequency of the identified target cell in the second network is performed during a wake-up period of a power-saving mode cycle associated with the second network.

24. The non-transitory processor-readable storage medium of claim 20, wherein the stored processor-executable instructions are configured to cause the processor of the wireless communication device to perform operations further comprising, in response to determining that initial cell selection or reselection to the identified target cell is not complete:
  determining whether full system information broadcast by the identified target cell has been received; and
  returning the priority level for activity on the second SIM to an original level in response to determining that the full system information broadcast by the identified target cell has been received.

25. The non-transitory processor-readable storage medium of claim 24, wherein the stored processor-executable instructions are configured to cause the processor of the wireless communication device to perform operations further comprising:
  processing the saved paging message for the second SIM in response to determining that the full system information broadcast by the identified target cell has been received.

26. The non-transitory processor-readable storage medium of claim 25, wherein the stored processor-executable instructions are configured to cause the processor of the wireless communication device to perform operations further comprising:
  determining whether the paging message indicates that a mobile terminating call to the second SIM is pending; and
  cancelling or suspending the active communication on the modem stack associated with the first SIM in response to determining that the paging message indicates that a mobile terminating call to the second SIM is pending.

27. The non-transitory processor-readable storage medium of claim 20,
  wherein the identified target cell belongs to a Global Mobile Communications (GSM) network; and
  wherein the stored processor-executable instructions are configured to cause the processor of the wireless communication device to perform operations such that receiving the first portion of system information broadcast by the identified target cell comprises receiving at least a system information message type 3 (SI3).

* * * * *